United States Patent
Yang

(10) Patent No.: US 7,722,135 B2
(45) Date of Patent: May 25, 2010

(54) BRAKING SYSTEM FOR VEHICLE AND BRAKING METHOD THEREOF

(75) Inventor: I-Jin Yang, Seongnam-si (KR)

(73) Assignee: Mando Corporation, Gyeonggi-Do (KR)

( * ) Notice: Subject to any disclaimer, the term of this patent is extended or adjusted under 35 U.S.C. 154(b) by 785 days.

(21) Appl. No.: 11/525,601

(22) Filed: Sep. 21, 2006

(65) Prior Publication Data

US 2007/0013230 A1     Jan. 18, 2007

(30) Foreign Application Priority Data

Dec. 7, 2005     (KR)     ...................... 10-2005-0118468

(51) Int. Cl.
*B60T 8/64*     (2006.01)

(52) U.S. Cl. ................. 303/152; 303/116.1; 303/119.1; 701/70; 701/83

(58) Field of Classification Search ................. 303/152, 303/155, 113.1, 116.1, 119.1, 85; 701/22, 701/70, 79, 83; 475/195; 477/92, 94, 182
See application file for complete search history.

(56) References Cited

U.S. PATENT DOCUMENTS

| | | | | |
|---|---|---|---|---|
| 5,568,962 | A | 10/1996 | Enomoto et al. | ................. 303/3 |
| 6,142,586 | A * | 11/2000 | Sakai | ......................... 303/152 |
| 6,244,674 | B1 * | 6/2001 | Kuno et al. | ................. 303/152 |
| 6,813,553 | B2 * | 11/2004 | Nakamura et al. | ............. 701/70 |
| 2007/0126382 | A1 * | 6/2007 | Kang et al. | ................. 318/376 |
| 2007/0210647 | A1 * | 9/2007 | Miyazaki et al. | ............. 303/155 |
| 2007/0273204 | A1 * | 11/2007 | Kodama et al. | ............. 303/146 |
| 2008/0106143 | A1 * | 5/2008 | Yazaki et al. | ................. 303/13 |

FOREIGN PATENT DOCUMENTS

| | | |
|---|---|---|
| CN | 1172456 A | 4/1998 |
| JP | 2000-354302 | 12/2000 |
| JP | 2001-18778 | 1/2001 |
| JP | 2001-359202 | 12/2001 |

* cited by examiner

*Primary Examiner*—Pam Rodriguez
(74) *Attorney, Agent, or Firm*—McDermott Will & Emery LLP

(57) ABSTRACT

A braking system for a vehicle, which can prevent an alteration in brake pedal toe force when a brake hydraulic pressure is increased or decreased based on a regenerative braking force obtained by a drive motor in an electric vehicle or hybrid vehicle, and a braking method thereof. To prevent an alteration in brake pedal toe force, the vehicle braking system includes a brake reservoir to receive brake oil therein, a normal close type valve to connect the brake reservoir to an inlet of a pump generating a hydraulic pressure in a brake line, a drive motor serving as a generator, the drive motor being adapted to convert a kinetic energy of the vehicle into electric energy to brake the vehicle by regenerative braking, and a control unit to recognize the amount of regenerative braking obtained by the drive motor and the amount of braking desired by a vehicle operator and to control the normal close type valve, so as to compensate for a brake hydraulic pressure corresponding to a difference between the regenerative braking amount and the desired braking amount by use of the brake oil in the reservoir.

6 Claims, 6 Drawing Sheets

(a)

(b)

BRAKING SYSTEM FOR VEHICLE AND BRAKING METHOD THEREOF

CROSS-REFERENCE TO RELATED APPLICATION

This application claims the benefit of Korean Patent Application No. 2005-0118468, filed on Dec. 7, 2005 in the Korean Intellectual Property Office, the disclosure of which is incorporated herein by reference.

BACKGROUND OF THE INVENTION

1. Field of the Invention

The present invention relates to a braking system for a vehicle, and, more particularly, to a braking system for a vehicle, which can prevent an alteration in brake pedal toe force when a brake hydraulic pressure is increased or decreased based on a regenerative braking force obtained by a drive motor in an electric vehicle or hybrid vehicle, and a braking method thereof.

2. Description of the Related Art

Generally, in operation of a braking system, if a vehicle operator presses a brake pedal, a pressure corresponding to a boost ratio of a booster is generated in a master cylinder based on a pedal toe force applied by the vehicle operator. As the pressure is transmitted to each wheel brake device through a valve, a wheel braking operation is realized. Differently from the above described conventional braking system, an electric vehicle or hybrid vehicle employs a drive motor as a electric generator, and uses a regenerative braking force as well as a frictional braking force to brake a vehicle.

Recently, restrictions related to exhaust gas have been tightened to prevent air pollution by exhaust gas of vehicles. Accordingly, to reduce the discharge amount of exhaust gas in response to the restrictions, electric vehicles using electricity as drive power or hybrid vehicles using electricity and gasoline together are becoming increasingly more widely used.

Electric vehicles include a high-capacity drive motor and a battery for storing electric energy, and are driven as the battery is charged and the drive motor is operated using the electric energy charged in the battery. The electric vehicles are clean vehicles completely free from the discharge of exhaust gas and are increasingly used to prevent air pollution. Hybrid vehicles are a cross between oil-powered vehicles and electric vehicles, and can be referred to as transient vehicles being spread at low costs prior to high-cost electric vehicles becoming more common.

In the case of the electric vehicles or hybrid vehicles, if the vehicle operator presses a brake pedal, a resulting pedal operating speed and pedal toe force are detected by a pedal travel sensor, and thus, a brake hydraulic pressure corresponding thereto can be calculated and generated by a hydraulic pump, etc. The electric vehicles or hybrid vehicles have a drive motor for the traveling of vehicles. During a speed-reduction or braking operation, the drive motor functions as a generator using a reverse torque of vehicle wheels, thereby serving to charge the battery. Also, the drive motor generates a regenerative braking force during the speed-reduction or braking operation. The regenerative braking force depends on various factors, such as the charge state of the battery, the speed of a vehicle, etc. Under the presence of the regenerative braking force, a brake hydraulic pressure has to be increased or decreased to fulfill the amount of braking desired by the vehicle operator.

FIG. 2 is a graph showing variations of frictional braking force and regenerative braking force depending on time. In an initial state of braking, a vehicle can be braked sufficiently only by the amount of regenerative braking. In this case, a brake hydraulic pressure is decreased by directing a hydraulic pressure generated by a vehicle operator's pedal toe force to other sites, thereby allowing the vehicle to be braked sufficiently only by the regenerative braking. However, in the case where such a decrease in brake hydraulic pressure is realized by brake oil in a master cylinder, there is a problem in that a brake pedal is depressed unintentionally due to a decreased pressure, thereby providing the vehicle operator with unusual pedal feeling. Although an electro-hydraulic brake (EHB) may be used to keep a braking pressure and pedal pressure constant, the EHB has problems of complicated structure and high costs thereof, and suffers from deterioration in braking reliability/durability.

SUMMARY OF THE INVENTION

The present invention has been made in order to solve the above problems. It is an aspect of the invention to provide a braking system for vehicles, which can achieve simplified configuration, low costs, and high reliability while maintaining a constant pedal pressure despite the alteration of a brake hydraulic pressure by a regenerative braking force, and a braking method thereof.

Consistent with one aspect, an exemplary embodiment of the present invention provides a braking system for a vehicle comprising: a brake reservoir to receive brake oil therein; a normal close type valve to connect the brake reservoir to an inlet of a pump generating a hydraulic pressure in a brake line; a drive motor serving as a generator, the drive motor being adapted to convert a kinetic energy of the vehicle into electric energy to brake the vehicle by regenerative braking; and a control unit to recognize the amount of regenerative braking obtained by the drive motor and the amount of braking desired by a vehicle operator and to control the normal close type valve so as to compensate for a brake hydraulic pressure corresponding to a difference between the regenerative braking amount and the desired braking amount by use of the brake oil in the reservoir.

The control unit may control the introduction or discharge of the brake oil into or from the reservoir by opening the normal close type valve to increase or decrease the brake hydraulic pressure based on the amount of regenerative braking.

The control unit may control a braking pressure of the vehicle by opening or closing the normal close type valve upon an antilock brake system (ABS) or traction control system (TCS) control.

Consistent with another aspect, an exemplary embodiment of the present invention provides a braking method for a vehicle comprising: detecting the amount of braking desired by a vehicle operator by use of a pedal travel sensor; calculating a difference between the desired braking amount and the detected regenerative braking amount; and controlling a brake hydraulic pressure to regulate an increase or decrease in the amount of frictional braking of the vehicle based on the difference between the desired braking amount and the detected regenerative braking amount, so as to brake the vehicle.

The amount of frictional braking of the vehicle may be regulated by controlling opening and closing operations of a normal close type valve that connects a brake reservoir storing brake oil therein to an inlet of a pump generating a hydraulic pressure in a brake line.

The opening and closing operations of the normal close type valve may be controlled to introduce or discharge the brake oil into or from the reservoir by opening the normal close type valve to increase or decrease the brake hydraulic pressure based on the amount of regenerative braking.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the exemplary embodiments of the invention will become apparent and more readily appreciated from the following description of the embodiments, taken in conjunction with the accompanying drawings, of which.

DETAILED DESCRIPTION OF THE PREFERRED EMBODIMENTS

Figure 1:
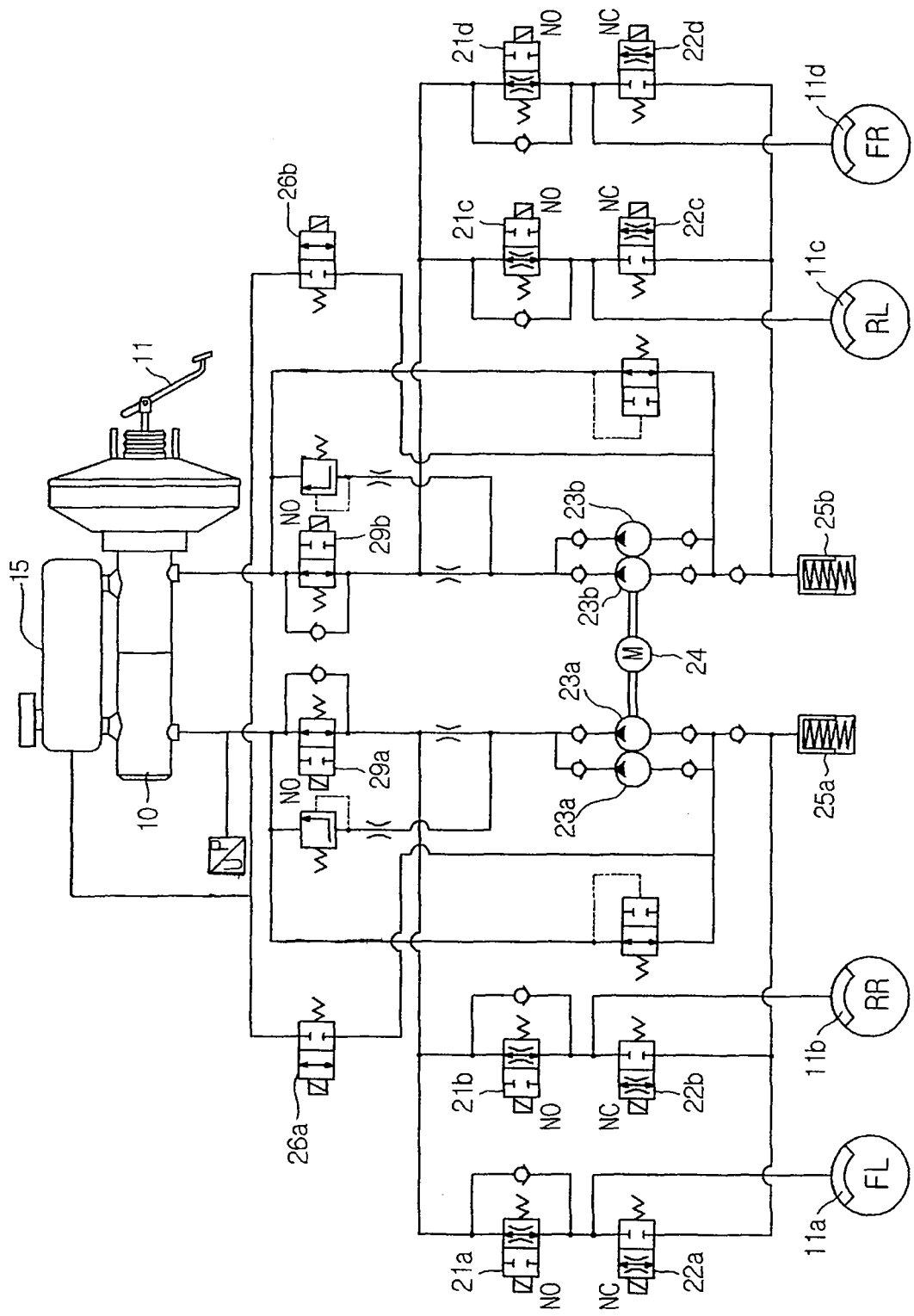
FIG. 1 is a hydraulic circuit diagram of a braking system consistent with the present invention.
Figure 2:
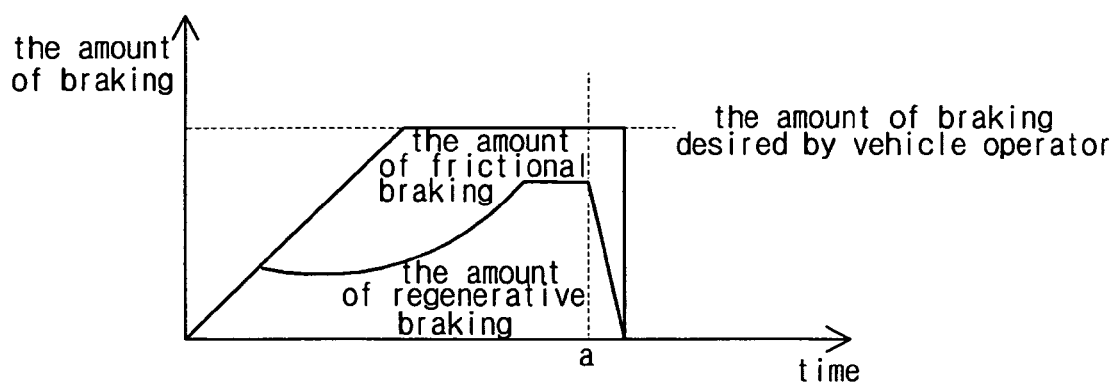
FIG. 2 is a graph showing variations of frictional braking force and regenerative braking force depending on time.

Reference will now be made in detail to exemplary embodiments of the present invention, examples of which are illustrated in the accompanying drawings, wherein like reference numerals refer to like elements throughout. The embodiments are described below to explain a pump assembly for a brake system consistent with the present invention by referring to the figures.

FIG. 1 is a hydraulic circuit diagram of a braking system consistent with the present invention. In operation of the braking system, if a vehicle operator's pedal toe force is applied to a booster through a brake pedal 11, the pedal toe force is increased by the booster and transmitted to a master cylinder 10. Thereby, a hydraulic pressure is generated in the master cylinder 10 and is transmitted to respective wheel cylinders 11a to 11d through first and second traction control valves 29a and 29b and first electronic valves 21a to 21d, which are normal open type valves. Also, to achieve the return of brake oil in the respective wheel cylinders 11a to 11d, the first electronic valves 21a to 21d are controlled to be closed, and second electronic valves 22a to 22d, which are normal close type valves, are opened, so as to allow the brake oil to be temporarily stored in low-pressure accumulators 25a and 25b. The low-pressure accumulators 25a and 25b function to feed the brake oil toward hydraulic pumps 23a and 23b if a predetermined amount of the brake oil is charged therein. A brake reservoir 15 is a container for storing the brake oil therein, and is connected to inlets of the hydraulic pumps 23a and 23b through bypass flow-paths. Normal close type opening/closing valves are provided on the respective bypass flow-paths, and are controlled in opening/closing operations thereof, so as to feed the brake oil stored in the brake reservoir 15 to the hydraulic pumps 23a and 23b, or return the brake oil into the reservoir 15.

The above described braking system comprises an electronic control unit (ECU), which is used to control the opening/closing operations of the first and second electronic valves 21a to 21d and 22a to 22d, so as to regulate a braking pressure to be applied to vehicle wheels. Also, the ECU is used to control operations of the hydraulic pumps 23a and 23b, so as to repeatedly pump the brake oil being returned along hydraulic lines to the wheel cylinders 11a to 11d, thereby realizing an intermittent braking operation.

In the above described braking system consistent with the present invention, as a result of providing the bypass flow-paths connected to the brake reservoir 15, a brake pressure can be increased or decreased by using the brake oil in the brake reservoir 15 without an alteration of the hydraulic pressure in the master cylinder 10. Thereby, a frictional braking pressure can be increased or decreased without an alteration in brake pedal pressure.

Figure 5:
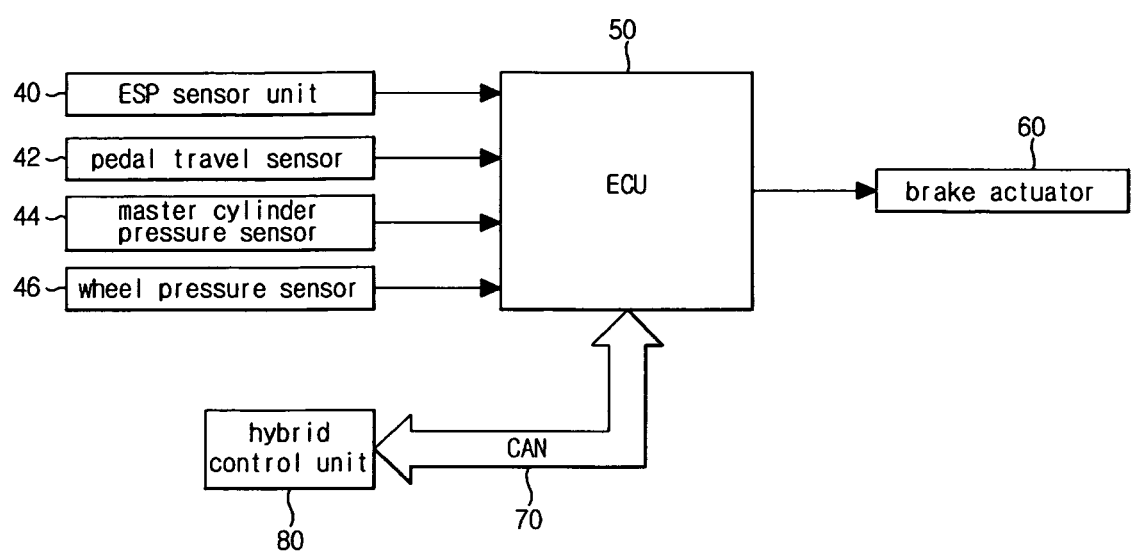
FIG. 5 is a block diagram showing a braking system consistent with the present invention.

FIG. 5 is a block diagram of the braking system consistent with the present invention. The braking system comprises an ESP sensor unit 40 including a variety of sensors, such as a steering angle sensor, a yaw-rate sensor, etc., a pedal travel sensor 42 to recognize the amount of braking desired by a vehicle operator, a master cylinder pressure sensor 44 to detect the pressure in the master cylinder, and wheel pressure sensors 46 to measure pressures of vehicle wheels. In the case of hybrid vehicles, a hybrid control unit 80 to control a drive motor, etc. is provided. The ECU 50 interchanges various data with the hybrid control unit 80 through a CAN communication, and controls a brake actuator 60 to regulate a braking pressure based on information from the variety of sensors.

Figure 3:
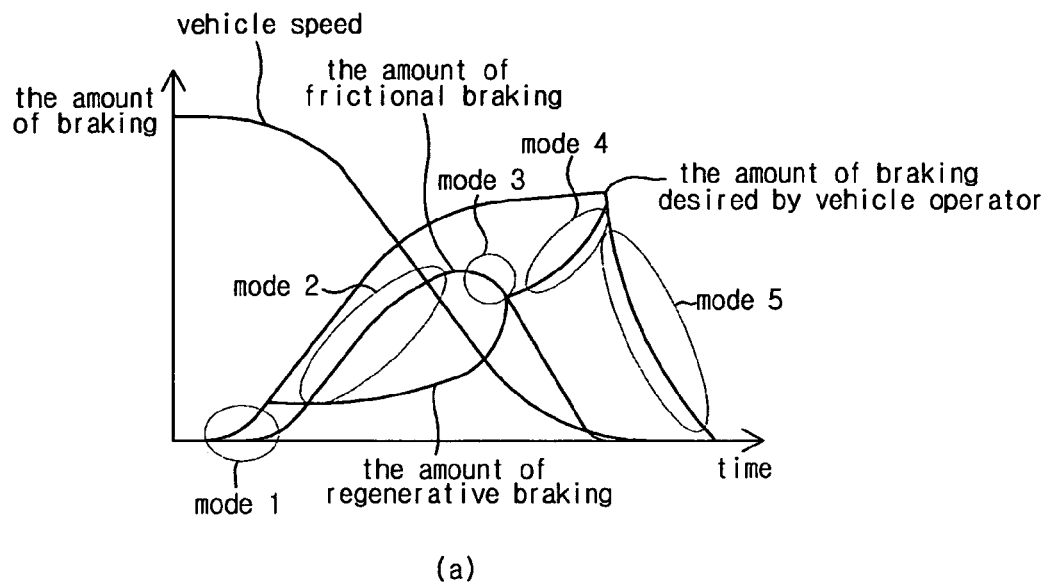
FIGS. 3A and 3B are graphs showing the speed of a vehicle and variations of frictional braking force and regenerative braking force depending on time when the regenerative braking force is high or low.
Figure 3:
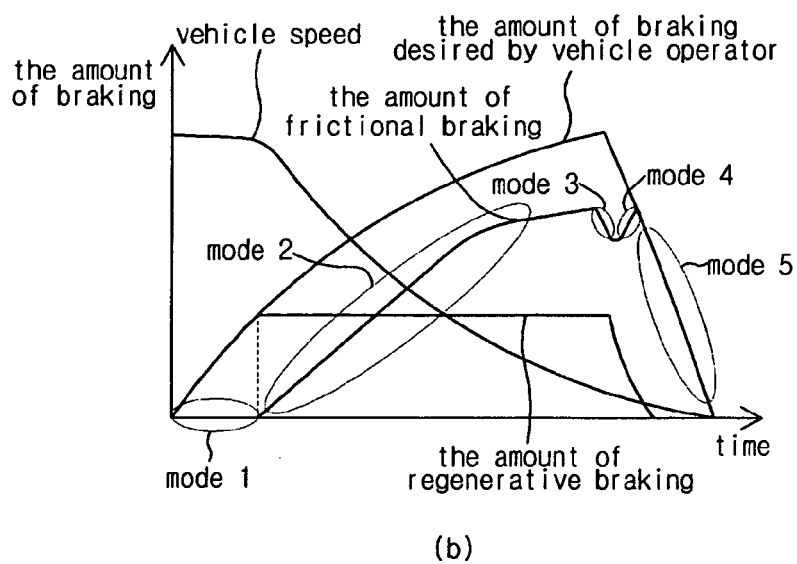

Now, the operation of the present invention having the above described configuration will be explained with reference to FIGS. 3A and 3B. If a vehicle operator presses the brake pedal 11 in an initial stage of braking (mode 1), the vehicle can be braked sufficiently by regenerative braking and the braking system has to be controlled so as not to generate a frictional braking force. Accordingly, a brake hydraulic pressure, which is generated in the master cylinder 10 by operation of the brake pedal 11, has to be decreased so as not to be transmitted to the wheel cylinders. For this, the opening/closing valves on the bypass flow-paths are opened to direct the hydraulic pressure generated in brake lines to the brake reservoir 15. This has the effect of maintaining a brake pedal pressure while preventing the hydraulic pressure from being applied to vehicle wheels. In modes 2 and 3, a frictional braking force is regulated in response to a variation in the amount of regenerative braking. The amount of regenerative braking depends on the charge state of the battery or the speed of a vehicle, and exhibits a rapid reduction below a predetermined vehicle speed. Mode 4 represents the rapid reduction in the amount of regenerative braking. In the case where the brake oil in the master cylinder 10 is used to rapidly increase a wheel pressure, there is a problem in that the brake pedal is depressed, causing excessive or insufficient braking by the vehicle operator, and resulting in failure of products, etc. In the present invention, to solve the above problems, the bypass flow-path opening/closing valves 26a and 26b are opened to allow the brake oil in the brake reservoir 15 to be used to increase the wheel pressure. In mode 5, no regenerative braking force is generated and thus, a conventional braking operation is performed based on a present situation. FIGS. 3A and 3B show the high and low regenerative braking forces, respectively. In general, when the regenerative braking force is high, a more unusual pedal feeling is generated. Thus, it can be understood that the braking method of the present invention is more efficient to deal with the high regenerative braking force.

Figure 4:
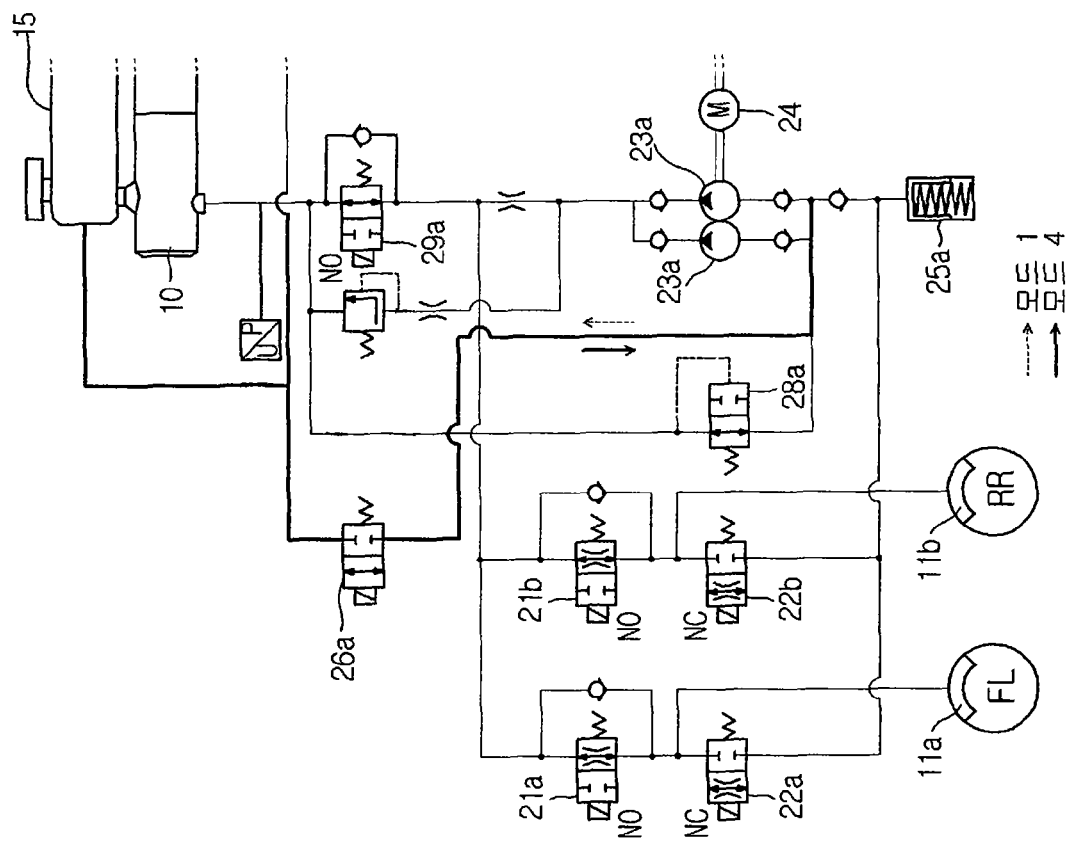
FIG. 4 is a hydraulic circuit diagram showing the flow of a hydraulic pressure upon an increase or decrease of frictional generating force consistent with the present invention.

FIG. 4 is a hydraulic circuit diagram showing the flow of a hydraulic pressure when the frictional braking force increases or decreases. Mode 1 represents the discharge of the brake oil from the low-pressure accumulator 25a into the brake reservoir 15 for achieving a decrease of wheel pressure, whereas Mode 4 represents the introduction of the brake oil for achieving a rapid increase of the wheel pressure.

Figure 6:
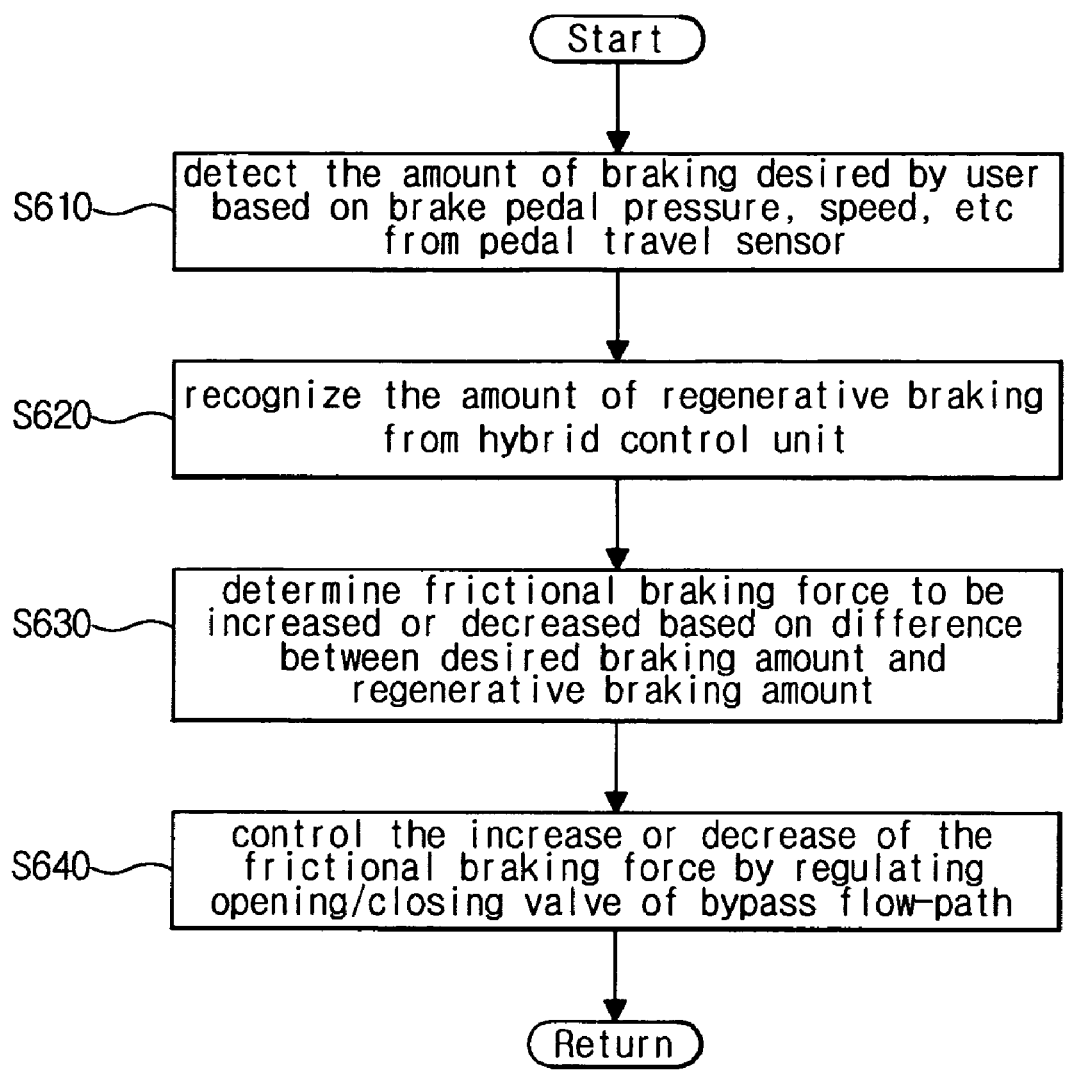
FIG. 6 is a flowchart showing a braking method consistent with the present invention.

FIG. 6 is a flowchart showing a braking method consistent with the present invention. If a braking operation is initiated by a vehicle operator, the pedal travel sensor detects the amount of braking desired by the vehicle operator based on information, such as a pressure applied to the brake pedal by the vehicle operator, pedal displacement speed, etc. (step S610). Also, the ECU 50 receives information about the amount of regenerative braking from the hybrid control unit 80 (step S620). Thereby, the ECU 50 calculates the amount of frictional braking needed after subtracting the amount of regenerative braking from the amount of braking desired by the vehicle operator, and determines the amount of a wheel pressure to be increased or decreased (step S630). Based on the determined amount of the wheel pressure to be increased or decreased, the ECU 50 controls the opening/closing operations of the valves provided on bypass flow-paths, so as to increase or decrease a brake pressure as much as the determined amount of the wheel pressure to be increased or decreased (step S640).

As apparent from the above description, the present invention can regulate a frictional braking force by controlling the opening or closing of flow paths connected to a brake reservoir without an alteration in pedal pressure, thereby providing a vehicle operator with a constant pedal feeling.

Further, the present invention has the effect of maintaining a constant pedal pressure even when a brake hydraulic pressure varies depending on a regenerative braking force while achieving various advantages of simplified configuration, low costs, and high reliability without any additional devices.

Although embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A braking system for a vehicle comprising:
   a brake reservoir to receive brake oil therein;
   a normal close type valve to connect the brake reservoir to an inlet of a pump generating a hydraulic pressure in a brake line;
   a drive motor serving as a generator, the drive motor being adapted to convert a kinetic energy of the vehicle into electric energy to brake the vehicle by regenerative braking; and
   a control unit to recognize the amount of regenerative braking obtained by the drive motor and the amount of braking desired by a vehicle operator and to control the normal close type valve so as to compensate for a brake hydraulic pressure corresponding to a difference between the regenerative braking amount and the desired braking amount by use of the brake oil in the reservoir, wherein the control unit is configured to open the normal close type valve to direct the hydraulic pressure generated in the brake line to the brake reservoir in an initial stage of braking.

2. The system according to claim 1, wherein the control unit controls the introduction or discharge of the brake oil into or from the reservoir by opening the normal close type valve to increase or decrease the brake hydraulic pressure based on the amount of regenerative braking.

3. The system according to claim 1, wherein the control unit controls a braking pressure of the vehicle by opening or closing the normal close type valve upon an antilock brake system (ABS) or traction control system (TCS) control.

4. A braking method for a vehicle comprising:
   detecting an amount of braking desired by a vehicle operator by use of a pedal travel sensor;
   calculating a difference between the desired braking amount and a detected regenerative braking amount;
   controlling a brake hydraulic pressure to regulate an increase or decrease in the amount of frictional braking of the vehicle based on the difference between the desired braking amount and the detected regenerative braking amount, so as to brake the vehicle; and
   opening a normal close type valve to direct hydraulic pressure generated in a brake line to a brake reservoir in an initial stage of braking.

5. The method according to claim 4, wherein the amount of frictional braking of the vehicle is regulated by controlling opening and closing operations of the normal close type valve that connects the brake reservoir storing brake oil therein to an inlet of a pump generating the hydraulic pressure in the brake line.

6. The method according to claim 5, wherein the opening and closing operations of the normal close type valve are controlled to introduce or discharge the brake oil into or from the reservoir by opening the normal close type valve to increase or decrease the brake hydraulic pressure based on the amount of regenerative braking.

* * * * *